Figure 1:
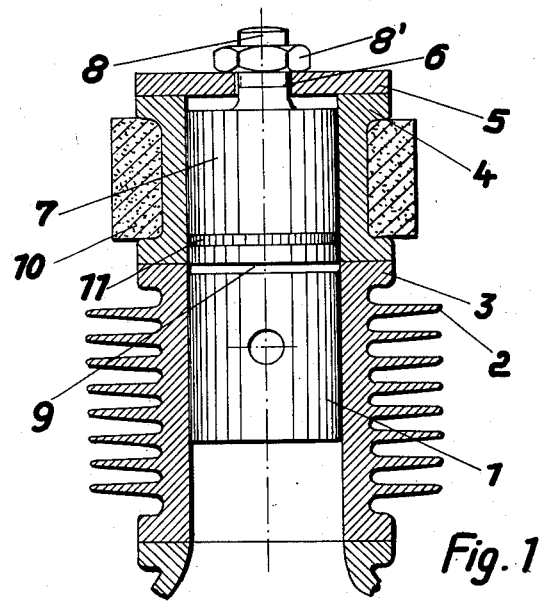

Feb. 4, 1958  H. TEEGEN  2,821,967
INTERNAL COMBUSTION ENGINE
Filed Oct. 1, 1954  4 Sheets-Sheet 1

INVENTOR.
HERMANN TEEGEN
By: Walter S. Bleston
ATTORNEY

Feb. 4, 1958    H. TEEGEN    2,821,967
INTERNAL COMBUSTION ENGINE
Filed Oct. 1, 1954    4 Sheets-Sheet 2

INVENTOR
HERMANN TEEGEN
By Walter J. Bleston
ATTORNEY

Feb. 4, 1958 H. TEEGEN 2,821,967
INTERNAL COMBUSTION ENGINE
Filed Oct. 1, 1954. 4 Sheets-Sheet 3

INVENTOR
HERMANN TEEGEN
By Walter S. Bleston
ATTORNEY.

Feb. 4, 1958 — H. TEEGEN — 2,821,967
INTERNAL COMBUSTION ENGINE
Filed Oct. 1, 1954 — 4 Sheets-Sheet 4
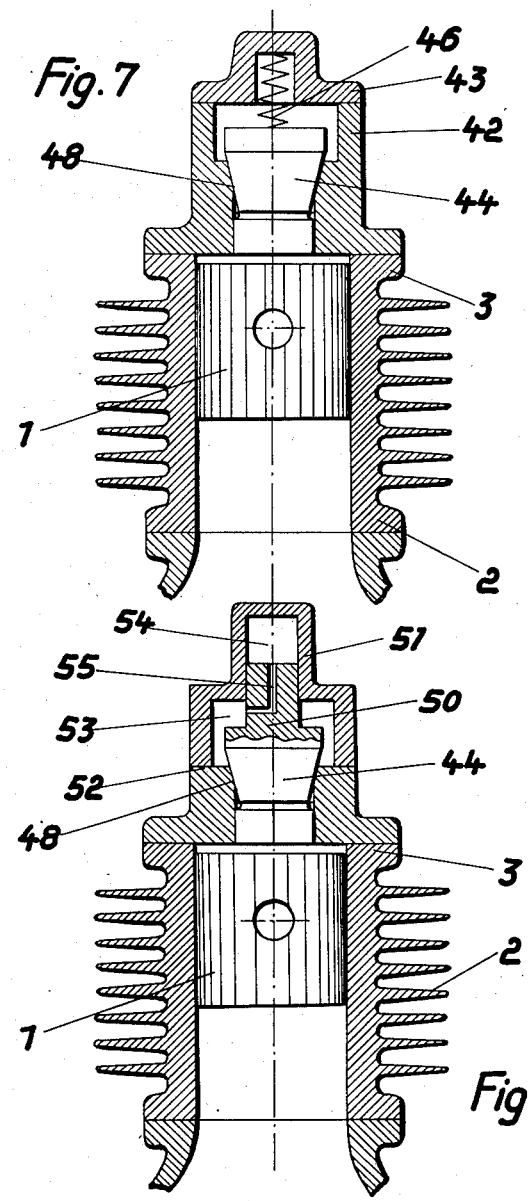
INVENTOR
HERMANN TEEGEN
By: Walter S. Bleston
ATTORNEY

United States Patent Office 2,821,967
Patented Feb. 4, 1958

2,821,967

INTERNAL COMBUSTION ENGINE

Hermann Teegen, Bielefeld, Germany, assignor, by mesne assignments, to Diesel Engine Company of Texas, Houston, Tex., a corporation of Texas Application October 1, 1954, Serial No. 459,717

Claims priority, application Germany September 5, 1953

16 Claims. (Cl. 123—48)

This invention relates to a self-igniting internal combustion engine of the type in which the fuel-air mixtures is compressed.

In internal combustion engines of this type, the time of ignition is not fixed by the operation of a spark plug or by the injection of the atomized fuel through a nozzle, but it depends on a number of factors, primarily on the mean temperature in the combustion chamber.

In order to cause the ignition to occur at the proper moment, the compression ratio must be changed in such a way that a high compression ratio, i. e., a small combustion chamber is adjusted for the start and in case of a cold combustion chamber, while a lower compression ratio, i. e., a larger combustion chamber, is adjusted when the engine is heated up.

Hitherto, in engines of this type this adjustment required by the influence of the temperature was carried out by hand and thus depended on the technical sense of the operator.

It is an object of the present invention to provide means for automatically adjusting the compression ratio.

With this and further objects in view, according to the present invention, means are provided for adjusting the compression ratio in accordance with the temperature of the combustion chamber or of the parts of the engine defining the combustion chamber, preferably under control of the different thermal expansion of several materials exposed to the temperature of the combustion chamber or of its surrounding, respectively. The said materials may directly influence the size of the combustion chamber by continuous or stepwise control. By way of alternative, said materials may influence the size of the combustion chamber indirectly, by mechanically or electrically influenced intermediate members, by continuous or stepwise control. Anyway, the materials are dimensioned and arranged in such a way that the compression ratio corresponds to the engine temperature.

The materials of different thermal expansion preferably are metals whose coefficients of thermal expansion differ by a large ratio.

For instance, zinc, having a coefficient of thermal expansion of 28 . . . $30 \times 10^{-6}$ or aluminum having a coefficient of thermal expansion of 20 . . . $24 \times 10^{-6}$, may be used as a metal of larger thermal expansion. These metals may be combined with metals of smaller thermal expansion, e. g., normal steel or cast iron having a coefficient of thermal expansion of 10 . . . $12 \times 10^{-6}$, or a steel with a predetermined high nickel content may be used, having a coefficient of thermal expansion of 1,5 . . . $2,5 \times 10^{-6}$.

The present invention also relates to various constructional features for realizing the principle of control as hereinbefore described, some preferred embodiments being illustrated in the accompanying drawings, Figs. 1-8, each being an axial section through the cylinder, including the cylinder head facing away from the crank case.

The control devices according to the invention are accommodated in the cylinder heads or in attachments thereof, as will be hereinafter described in greater detail.

Similar reference numerals denote similar parts in the different views.

It will be noted that the piston 1 operates in a cylinder 2 provided with cooling ribs and having a top flange 3 for accommodation of the control device.

Referring to the embodiment shown in Fig. 1, it will be noted that an attachment 4 is provided on the flange 3, said attachment 4 consisting of a material having a high coefficient of thermal expansion and being closed at the top by a plate 5. Secured to this plate is a control body 7 in the form of a cylindrical body whose reduced screw-threaded extension 8 projects through a bore 6 in this plate and is secured thereto by a nut 8'. The cylindrical or piston-shaped part of the body 7 occupies the space within the attachment 4, its lower end face forming the end of the combustion chamber 9.

The control body 7 consists of a material having a low coefficient of thermal expansion.

It will thus be understood that the combustion chamber 9 is arranged to have a relatively small volume before the start of the engine, so as to obtain a large compression ratio and a high compression temperature as it is required for the starting ignition. After the first ignitions the temperature produced in the combustion chamber 9 is imparted both to the attachment 4 and to the control body 7 which during further operation of the engine assume a corresponding temperature. Owing to its high coefficient of thermal expansion the attachment 4 will undergo a large expansion while the control body 7 owing to its lower coefficient of thermal expansion will undergo a smaller expansion.

The differential thermal expansions of the two bodies result in an enlargement of the combustion chamber 9. By suitable choice of the materials used for the attachment 4 and for the control body 7 and their effective overall length it can be ensured that the compression ratio in the cylinder space resulting from the operating temperature of the two members always corresponds to that required with the respective engine temperature in order to cause ignition at the proper moment.

In order to increase the control effect and to reduce the overall length, the cylindrical outer surface of the attachment 4 may be protected against the dissipation of heat to the outside, by an insulation 10.

In this way the temperature level of the control elements will be increased and either the control effect can be increased or the overall length of the control elements can be reduced.

It may be advisable to protect the gap between the control body 7 and the attachment 5 against penetration of combustion gases and residues by a packing, e. g., by one or more piston rings 11, by packing collars, or the like.

The arrangement shown in Fig. 1 in case of the temperatures occurring on the cylinder head of internal combustion engines and in view of the available materials with smaller and larger thermal expansion requires a certain overall length which may be detrimental with special types of engines and in case of larger working volume.

Figure 2:
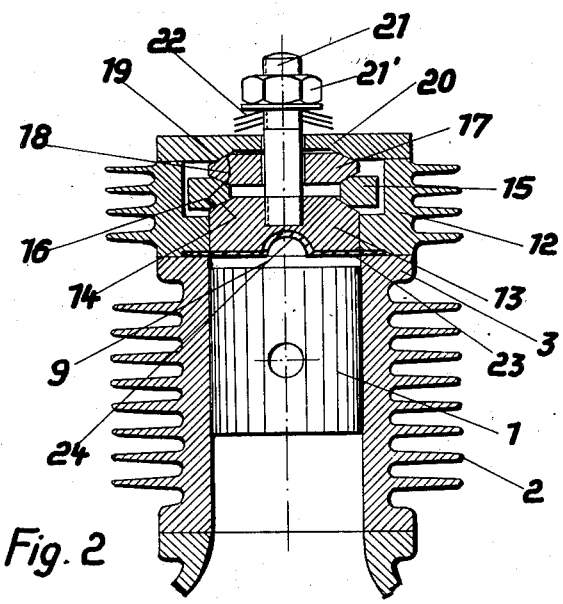

Fig. 2 shows a modification with more compact construction. In this case the cylinder casing 2 is provided with a cylinder head 12 which for instance may be provided with additional cooling ribs and embraces a control body 13 whose lower end faces the combustion chamber 9. The end of body 13 facing away from the combustion chamber is provided at its outer circumference with a conically bevelled surface 14. The coefficient of thermal expansion of this control body 13 is small in relation to that of a control ring 15 whose lower complementary bevel engages the bevelled surface 14 of the control body 13.

The outer cylindrical surface of the control ring 15 is guided for axial movement in a corresponding bore of the cylinder head 12. The upper inner bevelled surfaces 16 of the ring 15 is engaged by a further control body 17 having a complementary outer bevelled surface 18 and consisting of a material with low coefficient of thermal expansion compared to that of the control ring 15.

An upper conical bevelled surface 18 of the control body 17 engages a complementary conical surface 19 provided in a cover 20 which in turn consists of a material whose coefficient of thermal expansion is high compared to that of the control bodies 13 and 17. The members 13, 15, 17 and 20 are forced against each other by a nut 21 cooperating with a threaded bolt 21 and acting on a set of springs 22, in such a way that the various bevelled conical surfaces tightly engage each other.

This arrangement operates as follows:

As the control elements are heated under action of the temperature of the combustion chamber, the control ring 15 and the cover 20 will expand much more in diameter than the intermediate control bodies 13 and 17. As a result of this different expansion the two control bodies 13 and 17 under action of the force of the elastic members 22 and temporarily under action of the overpressure occurring in the combustion chamber will move towards the upper end of the cylinder, it being understood that the control body 13 will traverse a larger path than the control body 17. The combustion chamber, therefore, will be enlarged accordingly. On the other hand, with decreasing engine temperature, the combustion chamber will be reduced in size as the control bodies 13 and 17 are moved in a downward direction under action of the springs 22 and of the contraction of the members 15 and 20.

It will be noted that the amount of displacement of the control bodies and the regulating power of the arrangement, with given coefficients of thermal expansion, depends on the number and slope of the bevelled surfaces cooperating with each other. Where only very small displacements of the upper wall of the combustion chamber are required, the said arrangement can be simplified by using only one suitably shaped control element whose bevelled upper edge directly engages a complementary bevelled surface in the cover 20. On the other hand, any number of control bodies may be arranged in series in order to produce a larger change of the volume of the combustion chamber.

A diaphragm plate 23 conforming to the desired contour 24 of the combustion chamber may be clamped between the members 3 and 12 as shown in Fig. 2, in such a way that the diaphragm follows the movements of the control body 13, for protecting the control mechanism against penetration of the combustion gases and residues.

The embodiments illustrated in Figs. 1 and 2 result in a continuous change of the volume of the combustion chamber 9 as a function of the temperature of the cylinder head. In many instances, however, a stepwise change of said volume will be sufficient, in such a way that the volume of the combustion chamber is small at the start and increasing in steps as the engine is getting hot. The combustion chamber may either be directly enlarged or a second auxiliary combustion chamber may be added.

Figure 3:
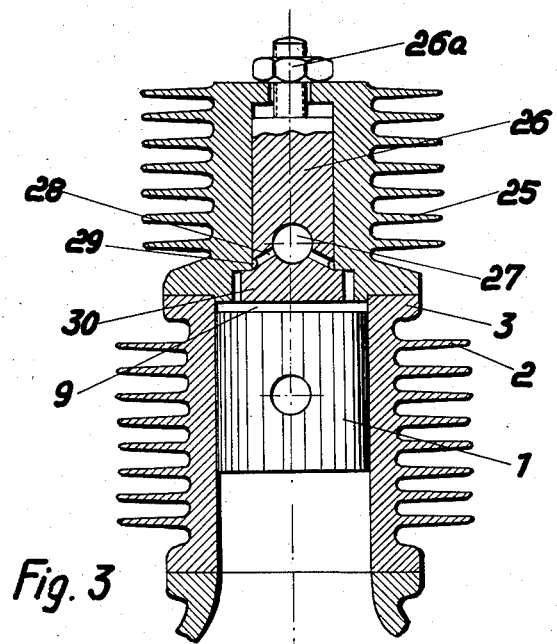
Figure 4:
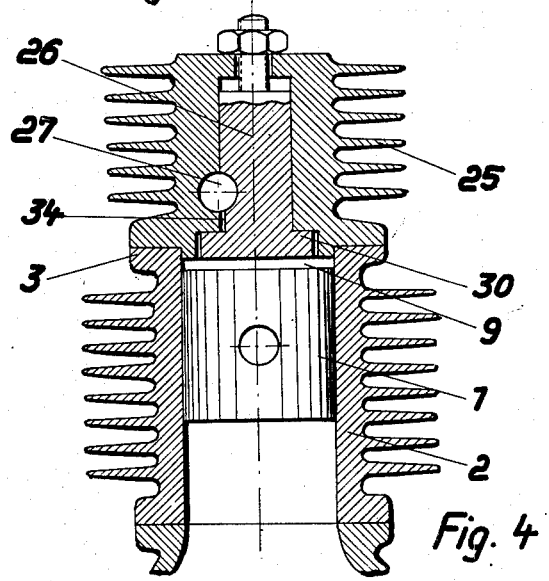

Figs. 3 and 4 show embodiments including an auxiliary combustion chamber which can be added to the main combustion chamber during operation of the engine.

According to Fig. 3 the flange 3 of the cylinder casing 2 carries an attachment 25 in whose bore is provided a cylindrical insert 26 having in its interior a second additional combustion chamber 27, e. g., of spherical shape connected to an annular chamber 29 through one or more channels 28.

At its lower end the control insert is formed with a flange or collar 30 received in a corresponding recess of the cylinder attachment 25. At its end facing away from the combustion chamber the insert 26 is connected to the attachment 25 by a nut 26a threadably engaged on a screw-threaded reduced extension 26a' of the insert 26, the shoulder of the collar 30 tightly engaging the complementary shoulder of the attachment 25 and being under a certain preliminary tension by action of the nut 26a. By way of alternative, an elastic member (not shown) may be provided between the nut 26a and the attachment 25 which consists of a material of a small coefficient of thermal expansion while the insert 26 consists of a material of a higher coefficient of thermal expansion.

This arrangement operates as follows:

As the control mechanism is heated, under action of the temperature developed in the combustion chamber, the insert 26 will undergo a larger expansion than the attachment 25. The preliminary tension produced by the nut 26a or by an elastic member is decreasing until at a predetermined moment the shoulder of the collar 30 clears its seating surface and permits the combustion gases to pass into the auxiliary combustion chamber 27 through the channels 28. From this moment the compression ratio is reduced.

Figure 5:
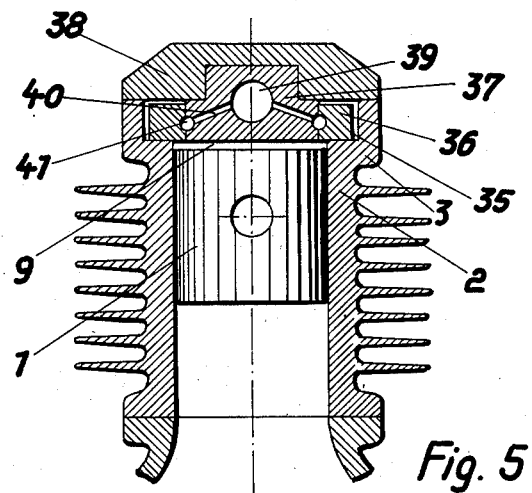

By way of alternative, the auxiliary chamber 27 may be laterally arranged as shown in Fig. 4, where it is formed partly by a recess in the insert 26 and partly by a recess in the attachment 25. On heating of the parts, the collar 30 of the insert is lifted from its seat and opens a lateral channel 34 whereby the auxiliary chamber 27 is added to the main combustion chamber 9.

Where a low overall height is required, the addition of an auxiliary combustion chamber may be effected by a control ring, as shown in Fig. 5. The cylinder casing 2 in this case is formed with a recess 35 on its side facing away from the crank case, for reception of a control ring 36 whose material has a high coefficient of thermal expansion and embraces a cylindrical control body 37 which is fixedly secured in a cover 38 and whose thermal expansion is small compared to that of the control ring 36.

The control body 37 has a cavity 39 forming the auxiliary combustion chamber and being connected through one or more channels 40 with an annular channel 41 which may be formed entirely in the external surface of the control body or entirely in the internal surface of the control ring or partly in both of said surfaces.

The operation of this arrangement is as follows:

As long as the engine is cold, the control ring 36 is tightly seated on the control body 37 so that there is no connection from the main combustion chamber 9 to the auxiliary combustion chamber 39. As the temperature of the cylinder head rises, the diameter of the control ring 36 will increase at a greater rate than the control body 37 with the result that a gap increasing in width with the temperature is formed between the two control elements, whereby a connection to the auxiliary combustion chamber 39 is created through the annular channel 41 and the channels 40.

Figure 6:
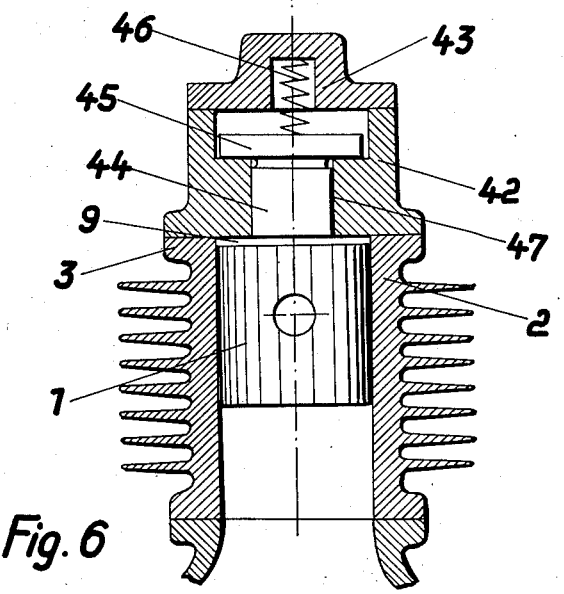

According to a further modification of the present invention, exemplified in Fig. 6, a stepwise change of the volume of the combustion chamber may be carried out without using an auxiliary combustion chamber, directly in the main combustion chamber. In this case, an attachment 42 is secured to the cylinder casing 2, said attachment consisting of a material of a high coefficient of thermal expansion and being closed by a cover 43. Provided in an internal bore of the attachment 42 is a control piston 44 consisting of a material of a low coefficient of thermal expansion and having on its side facing away from the combustion chamber a flange 45 which in its initial position engages a circular ring surface in the attachment 42. The fit between the internal diameter of the attachment 42 and the external diameter of the control piston 44 is adapted in such a way that with cold cylinder head a pinch fit exists between the members 42 and 44 which is so tight that even the peak pressures occurring during the start owing to the combustion are unable to force the control piston 44 out of its position. The combustion chamber 9 in this case has a size adapted for the start in cold condition. As the cylinder head is heated after the start of the engine, the internal diameter of the attachment 42 is expanding more intensively than the external diameter of the control piston 44. Hence, the compression between the two parts 42 and 44 is decreasing and finally under action of the combustion pressures the fit between the two surfaces is reduced to a slide fit and the control piston 44 is displaced in the direction towards the cover 43, under action of the combustion pressure and against the force of an elastic member 46 inserted between the control piston and the cover, whereby the volume of the combustion chamber 9 is increased. The amount of such increase is determined either by the distance of the end surface of the flange 45 from the cover 43 or by the force exerted by the spring 46. As the engine is stopped, the elastic member 46 forces the control piston back to its seat. The combustion chamber 9 now reoccupies the smaller space required for the next start, and the control piston 44 is again held in its position in the bore 47 of attachment 42 with a pinch fit as the engine cools down, owing to the different coefficients of thermal expansion of the parts.

In the arrangement shown in Fig. 6 it is required that on the one hand the interference or pinch fit is so tight at the start of the engine that the control piston 44 is safely held in its position, but on the other hand the time required to relieve the pinch fit under action of the rising temperature of the cylinder head should not be too long and moreover the influence of the external temperature to the attachment 42 should be minimized. This can be achieved if the absolute measure of the diameter of the surfaces engaging each other with the variable fit is made large enough.

On the other hand, where it is intended to reduce the overall dimensions, the time required to loosen the pinch fit can be reduced by providing fitting surfaces of a conical rather than of a cylindrical shape, as indicated in Fig. 7. In this case the control piston 44 and the attachment 42 have complementary conical surfaces 48 whose taper or apex angle of cone can be made relatively small and in fact much smaller than that indicated in Fig. 7 for the sake of illustration. It will be understood that the pinch fit between the control piston 44 and the attachment 42 in this case takes place in a shorter time, even with small diameters of the parts, than with a cylindrical shape of the respective surfaces.

It will be noted that the release of the control piston 44 in Figs. 6 and 7 occurs very abruptly. It may be advisable to retard this abrupt motion, on the one hand in order to avoid the impact stresses upon the stop surfaces of the control piston and the cover and on the other hand in order to avoid a too sudden change of the volume of the combustion chamber 9. Of course, a certain damping of the motions can be effected by the elastic member 46 inserted between the control piston and the cover, but a further slowing down of the movements of the control piston 44 may be desirable.

Such retardation may be effected by a pneumatic or hydraulic damping arrangement of the type shown in Fig. 8. The control piston 44 in this case is formed with a cylindrical extension 50 projecting into a complementary bore of a cover 51, with a tight fit. Provided between the attachment 52 and the cover 51 is a space 53 which communicates with a space 54 above the extension 50 through a channel 55 provided in the extension 50. As the control piston 44 is moved upwards, the space 53 which advantageously is smaller than the space 54, is further reduced and the medium or fluid contained therein is shifted into the space 54, through the channel 55, whereby the pressure in this space is increased. It will be understood that the movement of the control piston 44 is retarded by this compression and also by the flow resistances in the channel 55. On further upward motion of the control piston 44 the channel 55 passes beyond the controlling edge of the cover and is shut off entirely, whereby the retardation of the control piston is substantially increased. In the example illustrated, air is used as a retarding medium but it is also contemplated to provide similar arrangements using a liquid as a retarding medium.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. In an internal combustion engine the combination of a cylinder forming a combustion chamber at one of its ends, a cylinder head secured to said cylinder end and provided with a hollow space therein adapted to allow for an extension of said combustion chamber, said cylinder head including at least two members in engagement with each other, said members having substantially different co-efficients of heat expansion, the first one of said members when cold, constituting a closure of said space against an extension of said combustion chamber and being shiftable in relation to the second one of said members owing to the difference of expansion when both members are subjected to heat from said combustion chamber, so as to vary the size of said space within said head in addition to and in communication with said combustion chamber.

2. A device as claimed in claim 1, further comprising a membrane consisting of a material resistant to combustion gases, said membrane being secured between said cylinder and said cylinder head so as to form the end wall of said combustion chamber and to bear against said first member.

3. A device as claimed in claim 1, wherein that one of said members which has the higher co-efficient of expansion is ring-shaped, so as to change its diameter in accordance with a change of its temperature, whereby said ring-shaped member is movable in relation to said other member and instrumental to cause in said cylinder head a change of said space therein in communication with said combustion chamber.

4. In an internal combustion engine the combination of a cylinder forming a combustion chamber at one of its ends, a hollow cylinder head secured to said cylinder, said cylinder head including a cover and a side wall part enclosing a first cylindrical portion adjacent said cover and a second cylindrical portion adjacent said combustion chamber, a smaller and a larger ring-shaped element in co-axial arrangement in said first cylindrical portion and a piston-like member slidingly fitting said second cylindrical portion, said smaller ring being located between said cover and said larger ring, said larger ring being located between said smaller ring and said piston, said cover, said rings and said piston having faces with which they bear the one on the other and which are alternately beveled in opposite directions, said cover and said wider ring having a greater co-efficient of expansion than said smaller ring and said piston whereby said piston will move inward of said head when the temperature of said wider ring and said cover increases.

5. A device as claimed in claim 4, further comprising a diaphragm extended between said combustion chamber and said head, said piston bearing on said diaphragm.

6. A device as claimed in claim 4, said cover being provided with an axial hole, a stud-like projection of said piston extending through said rings and said hole, a spring surrounding the portion of said projection outside said head, and a retainer means on said projection to hold said spring tensioned between said cover and said means.

7. In an internal combustion engine the combination of a cylinder forming a combustion chamber at one of its ends, a cylinder head secured to said cylinder end and provided with a hollow space therein adapted to allow for an extension of said combustion chamber, said cylinder head including at least two members in engagement with each other, said members having substantially different co-efficients of heat expansion, at least one of said members being provided with said hollow space and with a duct from said space to said combustion chamber, said members bearing the one against the other so as to close said duct when cold, and to open said duct owing to the movement of one of said members in relation to the other when heated.

8. A device as claimed in claim 7, said member provided with said hollow space being a stepped piston, said other member being cylindric and open at one end towards said combustion chamber and closed at the other end except for an axial bore in the closure, said other member being interiorly stepped corresponding to the step of said piston, said piston including a stud-like projection extending through said axial bore, and a nut on said projection to hold said piston in a predetermined position in relation to said closure, said duct ending at said step, and the co-efficient of thermal expansion of said piston being higher than that of said other member.

9. A device as claimed in claim 7, wherein said hollow space is a recess in the side of said one member adjacent said other member, said other member being also provided with a recess so located that said two recesses complement each other to one chamber, and said duct extending between said members from said chamber to the end of said duct where the one member bears against the other one when cold.

10. In an internal combustion engine the combination of a cylinder forming a combustion chamber at one of its ends, a hollow cylinder head including a cylindrical side wall encompassing a chamber in continuation of but of larger inner diameter than said combustion chamber, a cover of said chamber, a stepped cylindrical first member embedded with a smaller diameter portion in said cover and located with a larger diameter portion in said chamber, and a ring-shaped second member tightly encompassing the periphery of said larger portion of said first member when cold, said first member being provided with a hollow space in its interior and a duct from said space to said periphery encompassed by said second member, the co-efficient of heat expansion of said second member being higher than that of said first member.

11. In an internal combustion engine the combination of a cylinder forming a combustion chamber at one of its ends, a cylinder head secured to said cylinder end and provided with a hollow space therein adapted to allow for an extension of said combustion chamber, said cylinder head including at least two members in engagement with each other, said members having substantially different co-efficients of heat expansion, the first one of said members being a piston and said second member being a structure co-axial with said cylinder and containing said hollow space which is closed at its end opposite said combustion chamber, said structure forming a stepped cylinder into the narrower portion of which at least a portion of said piston is fitted with a press fit when said cylinder head is cold, the co-efficient of thermal expansion of said structure being higher than that of said piston, an abutment in said structure for said piston so as to prevent the latter from protruding into said combustion chamber, and a resilient means between the closure of said structure and said piston tending to urge the latter towards said abutment.

12. A device as claimed in claim 11 wherein said narrower portion of said stepped cylinder is flared towards the wider portion throughout a part of its length, and said piston includes a frusto conical portion corresponding to said flared part.

13. In an internal combustion engine the combination of a cylinder forming a combustion chamber at one end, and a cylinder head including a hollow cylindrical portion in continuation of said combustion chamber, a hollow cover of said cylindrical portion, and a piston tightly fitting into said cylindrical portion when the latter is cold, said piston including means engaging in said hollow cover so as to constitute a damper for the piston movement, said hollow cylindrical portion being of a material having a higher co-efficient of expansion than said piston.

14. In an internal combustion engine the combination of a cylinder forming a combustion chamber at one of its ends, and a cylinder head including a first hollow cylindrical portion in continuation of said combustion chamber but of an inner diameter smaller than the latter, and a cover forming a second cylindrical portion in continuation of said first one and a third cylindrical portion in continuation of said second, said third portion being closed at its end opposite said second portion, and a piston tightly fitting in said first cylindrical portion when the latter is cold and extending through said second portion into said third portion with a sliding fit, a narrow duct being provided between said second and third cylindrical portions, and the material of said first cylindrical portion having a co-efficient of heat expansion higher than that of said piston.

15. A device as claimed in claim 14, the end part of said first cylindrical portion adjacent said second portion being interiorly flared, and said piston including a portion shaped according to said flared part.

16. A device as claimed in claim 14, said duct being provided in said extension of said piston so as to open with its one end into said third cylindrical portion and with its other end in the side of said extension in order to be closed by the wall of said third portion when the piston has moved a predetermined distance in the direction of the latter.

References Cited in the file of this patent

UNITED STATES PATENTS

| 1,874,682 | Woolson | Aug. 30, 1932 |
| 2,040,652 | Gaty | May 12, 1936 |

FOREIGN PATENTS

| 495,218 | Great Britain | Nov. 9, 1938 |
| 727,345 | Germany | Oct. 31, 1942 |